July 16, 1963

D. L. ORLOFF ETAL 3,097,392

STUFFING HOPPER UNIT

Filed Aug. 29, 1960

INVENTORS
DANIEL L. ORLOFF AND
BY RAYMOND J. KEATING
Cromwell, Greist and Warden
ATTORNEYS.

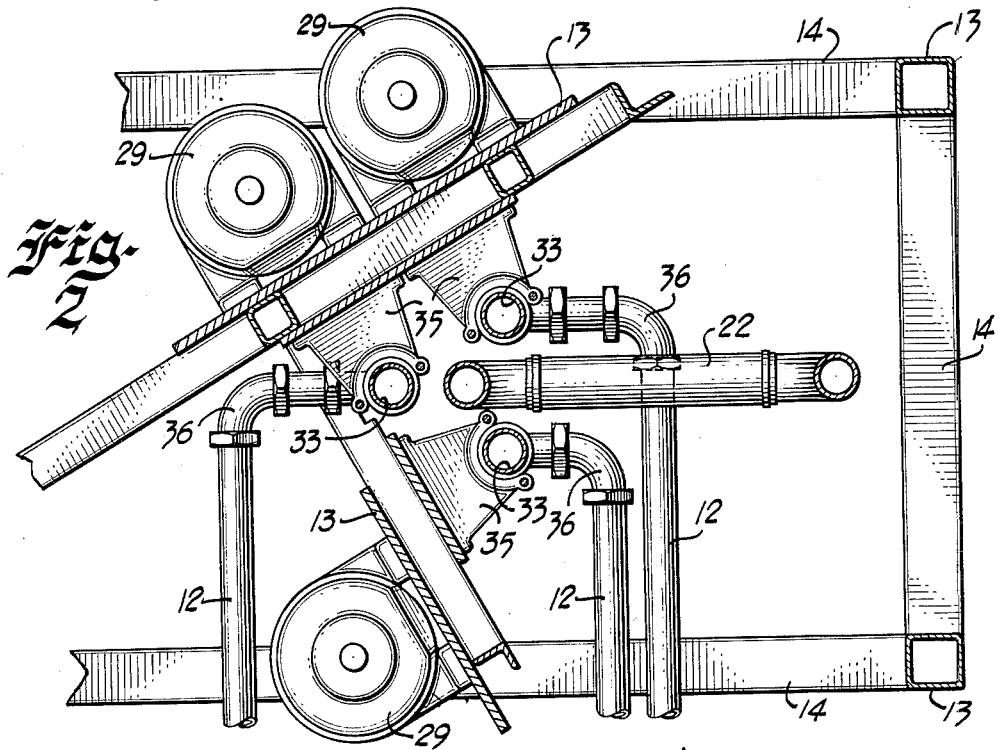
Fig. 2
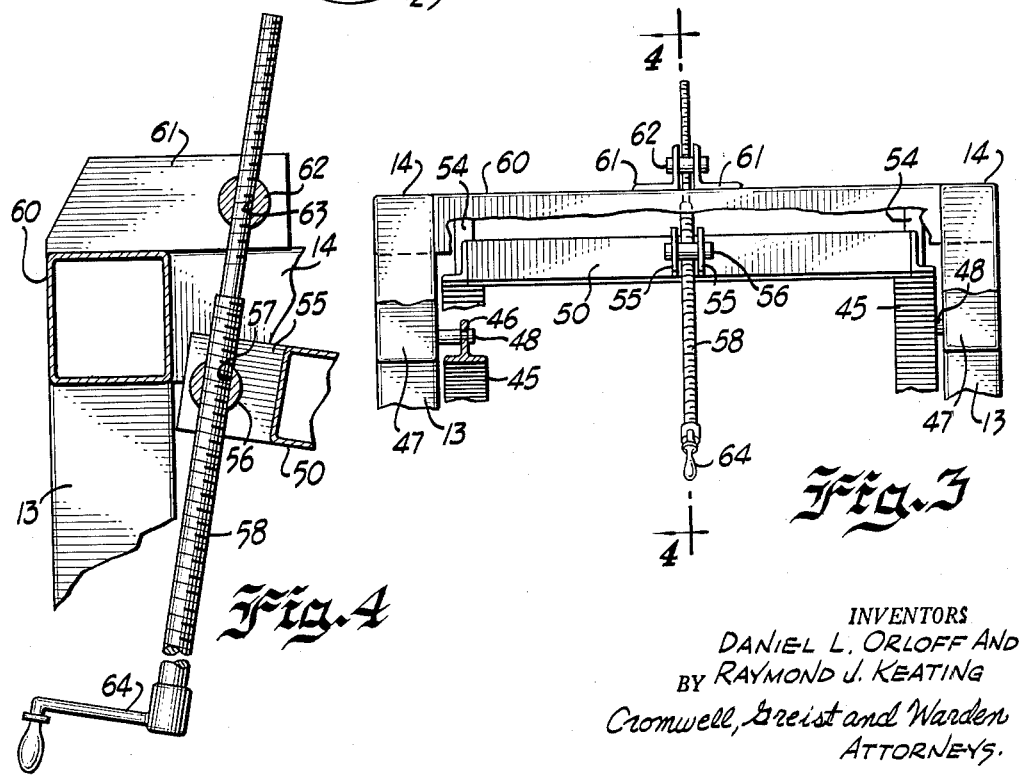
Fig. 4
Fig. 3
INVENTORS
DANIEL L. ORLOFF AND
BY RAYMOND J. KEATING
Cromwell, Greist and Warden
ATTORNEYS.

July 16, 1963 D. L. ORLOFF ETAL 3,097,392
STUFFING HOPPER UNIT
Filed Aug. 29, 1960 3 Sheets-Sheet 3

INVENTORS
DANIEL L. ORLOFF AND
BY RAYMOND J. KEATING
Cromwell, Greist and Warden
ATTORNEYS.

3,097,392
STUFFING HOPPER UNIT
Daniel L. Orloff and Raymond J. Keating, Madison, Wis., assignors to Oscar Mayer & Company, Inc., Chicago, Ill., a corporation of Illinois
Filed Aug. 29, 1960, Ser. No. 52,429
8 Claims. (Cl. 17—35)

The present invention relates to a new and improved hopper unit which is particularly adapted for use in the handling of oxidizable materials such as meat and the like. More specifically, the invention is directed to a new and improved hopper assembly designed to make use of the principle of "submerged feeding," the assembly being adapted to form a part of a continuous meat batter preparation and handling system wherein comminuted meat of the sausage variety is prepared and stuffed into casings.

Procedures followed in the commercial production of stuffed meat products, such as wieners, bologna and the like, have been practiced for many years with relatively few basic modifications or innovations being made thereto. The batter formulation, comminution and casing stuffing procedures have been batchwise operations each requiring a substantial amount of at least semi-skilled labor. Batchwise handling of meat batter is undesirable not only from the time-cost aspects thereof, but is also deleterious to the appearance of the meat product itself. Preparation and conditioning of the meat batter in the presence of air tends to create volumetric non-uniformity as well as oxidative discoloration of the meat. The occlusion of air in the batter creates pockets or voids therein which may well be retained during the casing stuffing operation and thus be present in the final product. This promotes the volumetric and weight non-uniformity in the stuffed product and occluded oxygen-bearing air will act to cause meat discoloration and other undesirable results.

Attempts have been made to reduce the effects of the foregoing disadvantages of batchwise meat preparation and stuffing operations. Meat batter has been prepared under vacuumization conditions or in the presence of an inert gas such as nitrogen. The use of an atmosphere of inert gas does not eliminate the volumetric and weight non-uniformity problem and the advantageous effects of vacuumization have largely been destroyed due to the necessity of continued batchwise handling of the batter following vacuumization preparation thereof. The stuffing operation is non-continuous, as with the use of conventional stuffing horns receiving a casing thereabout, it is necessary to discontinue stuffing during casing replacement. Thus the batchwise operational aspects of stuffing results in an accumulation of meat batter which is often exposed to air for a rather substantial period of time.

Continuous comminution of meat in batter preparation under vacuumization conditions has been practiced but the prepared batter has been handled subsequent to comminution and prior to stuffing in a batchwise manner. There has been no continuous closed system handling of the prepared batter in a manner that the batter has been protected from aeration. Closed system designs present maintenance problems as the equipment must be broken down and cleaned at fairly frequent intervals. Thus in order to prevent undue disruption of meat product preparation for apparatus cleaning purposes, the apparatus must be of a nature which permits quick and efficient disassembly and re-assembly.

It is an object of the present invention to provide a new and improved hopper unit and hopper unit assembly for use in a material handling system adapted for the handling of oxygen sensitive material.

A further object is to provide a new and improved hopper unit particularly adapted for use in a continuously operating sausage-type batter preparation and stuffing system, the hopper unit being capable of receiving and discharging the batter while protecting the same from oxidative action, the hopper unit further being readily accessible for cleaning purposes.

Still a further object of the present invention is to provide a new and improved stuffing hopper unit assembly which is capable of efficient utilization in a continuous operating meat batter preparation and stuffing system, the assembly incorporating special design features adapting the hopper unit thereof to submerged-type feeding and discharge, the assembly further providing for ready and efficient dismantling or separation of the various components thereof for cleaning access thereto.

Other objects not specifically set forth will become apparent from the following detailed description of the present invention made in conjunction with the accompanying drawings wherein:

FIG. 2 is a fragmentary transverse section of a portion of the assembly of FIG. 1 taken generally along line 2—2 therein;

FIG. 3 is a fragmentary view of an end portion of the assembly taken generally along line 3—3 in FIG. 1;

FIG. 4 is an enlarged fragmentary section taken generally along line 4—4 in FIG. 3;

Figure 1:
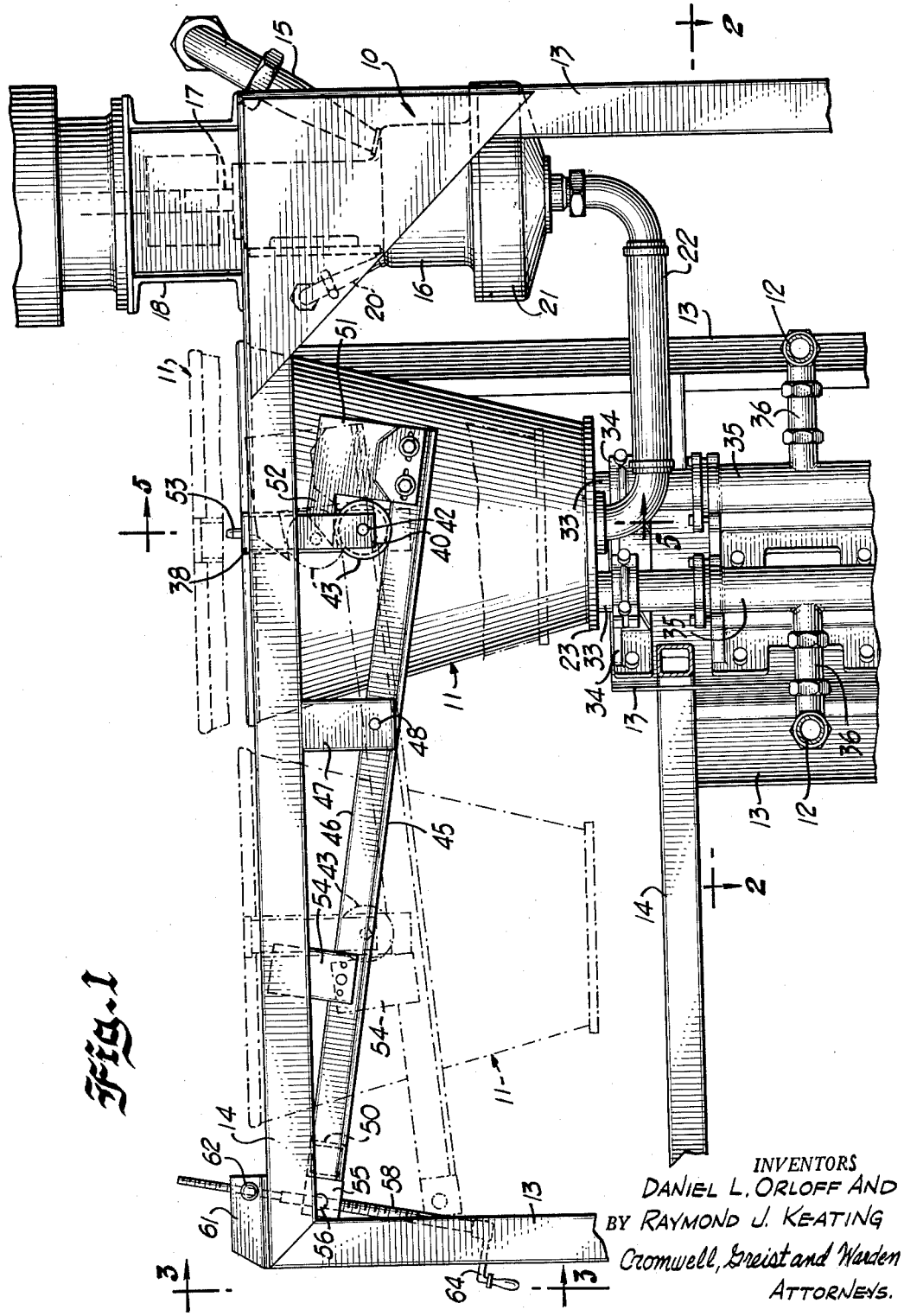
FIG. 1 is a fragmentary side elevation of the hopper unit and assembly of the present invention illustrating in broken lines certain operational features of the assembly.

FIG. 1 illustrates the combination of a continuous chopper 10, a material accumulation hopper 11 and a plurality of stuffing horns 12. This basic combination of elements is suitably mounted on a frame structure which includes a plurality of interconnected vertical frame members 13 and horizontal frame members 14. The chopper 10 may be of any suitable type capable of continuously comminuting material, such as meat, fed thereinto through a line 15. While the apparatus of the present invention is adapted for use in the handling of any material subject to deleterious oxidative action, the operational aspects of the invention will be described in conjunction with use of the apparatus in the preparation of sausage-type meat products.

Coarsely comminuted meat is continuously delivered through the inlet pipe 15 from any suitable equipment (not shown) such as an accumulation hopper which receives batches of coarsely chopped meat from a silent cutter or the like. The chopper 10 is preferably of the type disclosed in the co-pending application Serial No. 27,105, filed May 5, 1960. A chopper of this type is designed for the continuous comminution of meat being delivered thereinto in a steady stream, the comminution occurring as a result of high speed rotation of a knife assembly with the combined action of centrifugal force and gravity forming a continuous downwardly moving, relatively thin sleeve of accumulated meat along the inner surface of the barrel portion 16 which defines a comminution zone. The knife assembly is received in the barrel 16 and is operated by a shaft 17 which is suitably driven by a power source mounted in a housing portion 18 supported on the top of the main frame of the assembly. The knife assembly is operated at high rotational speed and during comminution the chopper is continuously under vacuumization conditions by a vacuum impressed through a pipe 20 placed in communication with the interior of the barrel 16.

Vacuumization of the meat undergoing comminution results in the removal of occluded air therefrom to prevent oxidative deterioration or discoloration of the meat and the removal of any air pockets formed therein which tend to produce non-uniformity in the final product. The comminuted meat moves downwardly along the inner surface of the barrel 16 and is deposited into a rotating bowl portion 21 which is also rotated with the knife assembly at a high speed. Material is accumulated along the inner surface of the bowl 21 by centrifugal force and a nozzle-type material pick-up means is positioned within the bowl 21 and scoops the material therefrom into a pipe 22. The pipe 22 is closed to the atmosphere and the force under which the material is delivered into the pipe is adequate to provide for continuous movement of the material therethrough.

Figure 5:
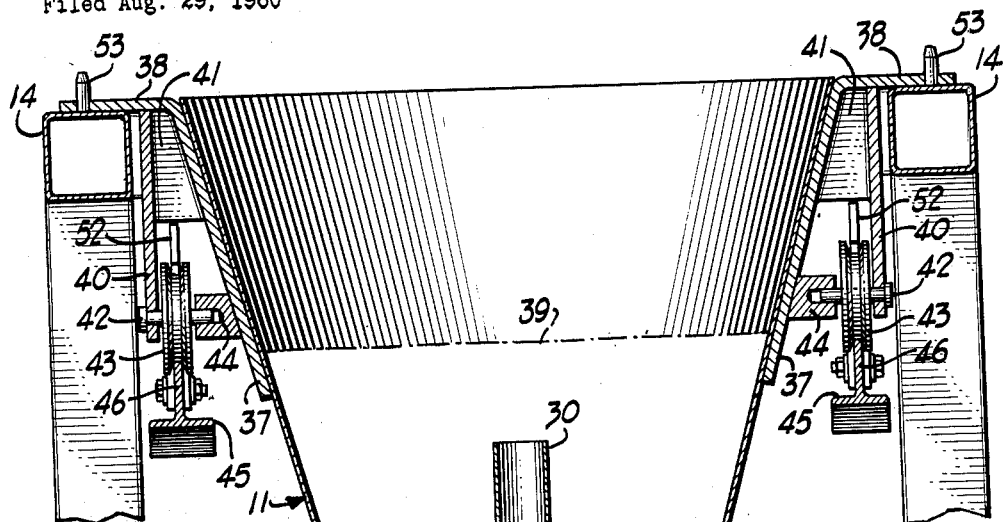
FIG. 5 is an enlarged fragmentary vertical section of the hopper unit of the assembly taken generally along line 5—5 in FIG. 1.

The pipe 22 delivers the material into the hopper 11 through the bottom thereof. The hopper 11 is best shown in FIG. 5 is of frusto-conical shape provided with a bottom closure plate 23 having a center opening 24 extending therethrough. The inner surface of the opening 24 is peripherally grooved and mounts a gasket 25 in the form of an O-ring. The pipe 22 at its end designed for connection with the hopper 11 extends vertically upwardly and is formed with a lead in tapered or beveled end surface for self-guiding in the opening 24 to place the cylindrical surface of the pipe in sealed engagement with the gasket 25. The inner surface of the bottom closure plate 23 has suitably attached thereto an annular base member 26 which is centrally apertured and in alignment with the pipe 22 and is formed with a radially inwardly directed shoulder 27. Radially outwardly of the shoulder 22 is an upstanding annular sleeve-like rib 28 in which a vertically upwardly directed standpipe 30 is suitably mounted.

Figure 6:
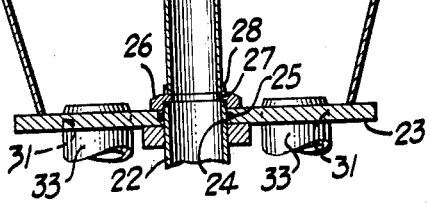
FIG. 6 is a fragmentary side elevation of the hopper unit of the assembly illustrating certain operational aspects thereof.

The bottom closure plate 23 is further provided with a plurality of meat discharge openings 31 mounting O-ring gaskets 32 (FIGS. 6 and 7) therein for sealing engagement with the cylindrical surfaces of discharge pipes 33 beyond their vertical tapered or conical lead in ends. Referring to FIGS. 1 and 2, the discharge pipes 33 are suitably supported by brackets 34 which in turn are suitably supported on vertical frame members 13. Material discharge pumps 35 are in communication with the discharge pipes 33 and are vertically mounted on the frame member 13 to operate to draw meat from the hopper 11 and move the same through connecting pipes 36 into the stuffing horns 12. Power sources 29 drive the pumps 35, these pumps being preferably of the Moyno type using a progressing cavity action which does not damage the meat during passage through the pump chamber. The discharge pipes may constitute the stators of the pumps 35 where Moyno pumps are used. Suitable casings are received over the ends of the stuffing horns 12 in the usual manner and suitable control means (not shown) are provided to shut off each individual pump 35 during casing replacement. As shown in FIG. 2, three stuffing horn assemblies are utilized with the hopper 11, but it should be borne in mind that any number of such units may be used.

Operation of the combined elements described above involves the continuous delivery of comminuted meat from the chopper 10 through the pipe 22 into the hopper 11. The meat is delivered upwardly through the standpipe 30 flowing outwardly therefrom to form an accumulation of meat in the hopper which may rise to any desired height such as that indicated by the broken line 39 in FIG. 5. It will be borne in mind that the meat during comminution is completely de-aerated and that this meat is delivered through a closed system to the hopper 11. Once an adequate accumulation of meat is developed in the hopper 11 to an extent that the standpipe 30 is completely submerged, meat delivered into the hopper 11 will accumulate below the surface 39 and not be exposed to the atmosphere. Submergence will preferably be adequate to accommodate any delivery surges. This operational aspect includes the principle of submerged feeding with attendant protection of meat being delivered into the hopper and withdrawn therefrom from contact with the atmosphere. In other words, the top surface portion of the accumulated meat protects the remainder of the meat therebelow from contact with air. The standpipe extends substantially upwardly into the hopper to provide for standard "first in-first out" operation. An open top hopper 11 is used to facilitate cleaning of the equipment in a manner which will be described.

Meat is continuously withdrawn from the hopper 11 through the discharge pipes 33 and delivered to the stuffing horns 12. This meat is not in contact with the atmosphere during such delivery and is pumped into the casings while still completely de-aerated. The particular design of a hopper 11 permits periodic operation of individual stuffing horns which is essential in order to accommodate intermittent casing replacement. Thus the stuffing horns 12 will operate periodically but the hopper 11 will always provide an adequate supply of meat while accumulating the meat during temporary disruption of casing stuffing operations.

FIG. 5 illustrates the hopper 11 as including inverted L-shaped plates 37 fixed along opposite sides of the hopper and providing a pair of outwardly directed flanges 38. The flanges 38 extend over the top surface of the uppermost horizontal frame members 14 and have depending therefrom just inwardly of the horizontal frame members 14 pin plates 40. These plates extend vertically downwardly and are fixed at their upper ends to the hopper structure by webs 41. A horizontal pin 42 is received through each plate 40 near the bottom end thereof and mounts inwardly thereof a grooved wheel or roller 43. The inner ends of the pins 42 are suitably journaled in projecting housings 44 mounted on the plates 37.

The rollers 43 are mounted for rotation on a pair of longitudinally extending supporting tracks 45 which are located just inwardly of the frame of the assembly. Each track 45 is provided with a vertically directed rail portion 46 the top edge of which is received in the grooves of the rollers 43. As shown in FIG. 1, the tracks 45 are pivotally mounted from hangers 47 attached to the top horizonotal frame member 14 and depending therefrom. Pins 48 extend through the hangers 47 and tracks 45 to provide fulcrum points about which the tracks will tilt. Track attachment is shown in FIG. 3 and it will be noted that the tracks 45 are interconnected at their ends by transverse bars 50. From the arrangement described it will be understood that the track structure is in the form of a tiltable frame along the side members of which the hopper 11 can move toward and away from opposite ends. The innermost ends of the tracks 45 are provided with hook-like plates 51 which are suitably attached to the tracks and extend vertically upwardly therefrom. The plates include rearwardly projecting roller engaging finger-like portions 52 which are spaced from the tracks sufficiently to receive the rollers between the same and the tracks. The flanges 38 are apertured and receive therethrough vertically upwardly projecting hopper alignment pins 53 which are fixedly mounted on the top surfaces of the top horizontal frame members 14. The tracks beyond the supporting hangers 47 toward the outer ends thereof are provided with vertically directed roller abutment plates 54 which limit the extent to which the hopper 11 is movable toward the outer end of the tracks.

The entire track frame may be pivoted about the pins 48 by use of any suitable actuating mechanism such as the threaded rod assembly shown in FIGS. 3 and 4. The outer end transverse frame member 50 of the track frame has attached thereto a pair of outwardly projecting ears 55 which receive therethrough a pivotal rod-shaped nut 56 which is provided with a transverse tapped opening 57 through which a rod 58 is threadedly received. The main frame of the assembly includes a transverse end frame member 60 extending between the top horizontal frame members 14. The frame member 60 includes a pair of ears 61 which pivotally mount therebetween a rod-shaped nut 62 which is of the same type as the nut 57 having a transverse tapped aperture 63 therein. The rod 58 is provided along the lower portion thereof with a left-handed thread and along the upper portion thereof with a right-handed thread with the nuts 56 and 62 being cooperatively threaded relative to the respective rod portions received therethrough. The bottom end of the rod 58 is provided with an operating handle 64. Rotation of the rod 58 results in raising or lowering of the outermost end of the track unit to tilt the same and control positioning of the hopper 11 supported thereby.

Figure 7:
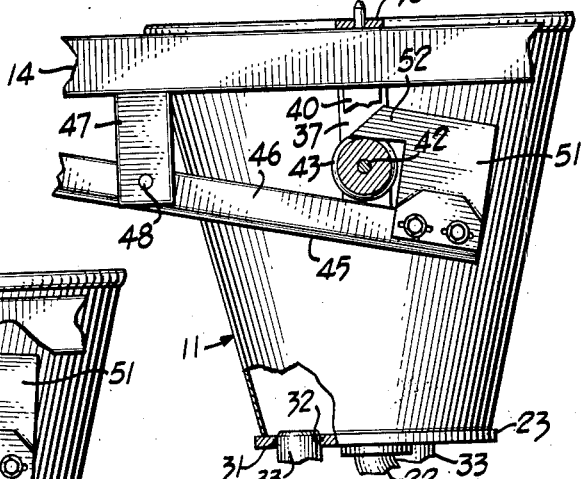
FIG. 7 is a view similar to FIG. 6 illustrating other operational aspects of the hopper unit.

The left-hand portion of FIG. 1 illustrates the hopper 11 displaced from the delivery pipe 22 and discharge pipes 33 for cleaning purposes. In this position of the hopper shown in broken lines, the track unit actuating mechanism including the rod 58 has been operated to tilt the track unit to the position shown in broken lines. All interior parts of the hopper 11 are completely available for quick and efficient cleaning thereof. Similarly the pipes 22 and 33 are open for efficient cleaning. In moving the hopper back to its operative position, the track unit actuating mechanism is operated to tilt the track unit to the position shown in full lines in FIG. 1. In doing so the hopper 11 rolls along the tracks 45 until they abut the plates 51 at the ends thereof. At the time of abutment, complete tilting of the track unit has not been attained and the hopper 11 is still actually raised above the top frame members 14 in the position shown in broken lines in the center of FIG. 1. In this raised position the hopper 11 is now adequately centered over the open ends of the pipes 22 and 33 and the pins 53 are aligned with the apertures in the flanges 38 of the hopper. As the track unit tilts further (FIG. 6) the hopper 11 is lowered vertically downwardly with the pins 53 being received through the apertures in the flanges 38 to completely center the hopper and the tapered ends of the pipes 22 and 33 are received in the appropriate openings in the bottom closure plate 23. Thus automatic connection between the pipes and the interior of the hopper is attained and the hopper, in effect, moves down into sealed engagement with cylindrical surfaces of pipes. However, in order to prevent any pipe damage by hopper weight, the flanges 38 will engage the top surfaces of the frame members 14 in hopper supporting relation therewith at a point in the vertical downward movement of the hopper which prevents any undesirable pressure on the pipes and associated equipment. Further tilting of the track unit results in the weight of the hopper 11 being carried substantially by the assembly frame and the rollers 43 will actually leave their associated tracks 45 as shown in FIG. 7. The projecting overhead fingers 52 of the stop plates 51 will then engage the rollers 43 and will actually apply pressure against the hopper 11 in a downward direction to assure positive seating of the same on the top frame members 14. Thus the friction supplied by the gaskets 25 and 32 will be adequately overcome to assure proper insertion of the pipes 22 and 33 in their respective openings but hopper weight will not be transferred to the pipes.

In the manner described above the hopper 11 is automatically placed in operational connection and communication with the material delivery and discharge pipes. Similarly, lifting and displacement of the hopper 11 from the pipes 22 and 33 for cleaning purposes is brought about merely by operation of the track unit actuating mechanism in a simple and efficient manner. Individual connection or disconnection of the material supply and discharge pipes is completely eliminated and the shut-down time of the apparatus for cleaning purposes is materially reduced. The provision of the pins 53 assures vertical movement of the hopper 11 during lowering or lifting thereof into and out of pipe attachment. This feature prevents possible pipe end damage and assures proper alignment and seating of the hopper with the pipes.

Obviously certain modifications and variations of the invention as hereinbefore set forth may be made without departing from the spirit and scope thereof, and therefore only such limitations should be imposed as are indicated in the appended claims.

We claim:

1. A hopper unit for material accumulation and delivery, said unit comprising a frame mounting a hopper therein, said hopper being truncated and open at the top thereof while being provided with a closure plate at the bottom thereof, a material delivery opening in said closure plate, standpipe means in communication with said delivery opening in the interior of said hopper to deliver material up into said hopper from the bottom thereof, said delivery opening being adapted to receive a material delivery pipe therein, at least one material discharge opening in said closure plate offset from said delivery opening for the discharge of material from said hopper below the inner end of said standpipe means, said discharge opening being adapted to receive a material discharge pipe therein, and hopper lifting means forming a part of said frame and connected to said hopper to lift the same for disconnection from said pipes during cleaning thereof.

2. The hopper unit of claim 1 wherein said delivery and discharge openings include gasket means therein to receive conical pipe ends inserted in said openings in sealing engagement therewith.

3. A hopper unit for material accumulation and delivery, said unit comprising a frame having tiltable track means forming a part thereof, a hopper slideably mounted on said track means for movement from one end to the other end of said track means upon tilting thereof, upstanding stationary material delivery and material discharge pipe means within said frame adjacent one end of said track means, said pipe being in communication with the interior of said hopper through openings in the bottom thereof, said hopper having a standpipe therein in communication with said material delivery pipe means to deliver material up into the interior of said hopper well above the openings for said discharge pipe means, and operating means for said track means to tilt the same to lift said hopper out of communication with said pipe means for movement thereof toward the other end of said track means.

4. A hopper unit for material accumulation and delivery, said unit comprising a frame having tiltable track means forming a part thereof, a hopper slideably mounted on said track means for movement from one end to the other end of said track means upon tilting thereof, upstanding stationary material delivery and material discharge pipe means within said frame adjacent one end of said track means, said pipe being in communication with the interior of said hopper through openings in the bottom thereof, said hopper having a standpipe therein in communication with said material delivery pipe means to deliver material up into the interior of said hopper well above the openings for said discharge pipe means, and operating means for said track means to tilt the same to lift said hopper out of communication with said pipe means for movement thereof toward the other end of said track means, each of said pipe means having tapered ends of reduced diameter to be readily received in the bottom openings of said hopper, said openings being provided with gasket means for sealing engagement with cylindrical surfaces of said pipe means inwardly of said tapered ends.

5. A hopper unit for material accumulation and delivery, said unit comprising a frame having tiltable track means forming a part thereof, a hopper slideably mounted on said track means for movement from one end to the other end of said track means upon tilting thereof, upstanding stationary material delivery and material discharge pipe means within said frame adjacent one end of said track means, said pipe means being in communication with the interior of said hopper through openings in the bottom thereof, said hopper having a standpipe therein in communication with said material delivery pipe means to deliver material up into the interior of said hopper well above the openings for said discharge pipe means, and operating means for said track means to tilt the same to lift said hopper out of communication with said pipe means for movement thereof toward the other end of said track means, said unit including hopper guide and support means carried on said frame with said track means being tiltable to an extent that said hopper is supported by said frame by reason of said hopper guide and support means and not said pipe means when said hopper is in communication with said pipe means.

6. The hopper unit of claim 3 wherein said track means is in the form of parallel tracks extending along opposite sides of said hopper and interconnected for unitary operation, the ends of said tracks adjacent said pipe means being provided with hook-like stop means, rollers carried by said hopper and in supported engagement on said tracks, said rollers being dimensioned to be received in said hook-like stop means when said hopper is in communication with said pipe means for urging of said hopper down into sealed engagement with said pipe means upon further tilting of said tracks.

7. A hopper unit for material accumulation and delivery, said unit comprising a frame having tiltable track means forming a part thereof, a hopper slideably mounted on said track means for movement from one end to the other end of said track means upon tilting thereof, upstanding stationary material delivery and material discharge pipe means within said frame adjacent one end of said track means, said pipe means being in communication with the interior of said hopper through openings in the bottom thereof, said hopper having a standpipe therein in communication with said material delivery pipe means to deliver material up into the interior of said hopper well above the openings for said discharge pipe means, and operating means for said track means to tilt the same to lift said hopper out of communication with said pipe means for movement thereof toward the other end of said track means, each of said pipe means having tapered ends of reduced diameter to be readily received in the bottom openings of said hopper, said openings being provided with gasket means for sealing engagement with cylindrical surfaces of said pipe means inwardly of said tapered ends, said unit including hopper guide and support means carried on said frame with said track means being tiltable to an extent that said hopper is supported by said frame by reason of said hopper guide and support means and not said pipe means when said hopper is in communication with said pipe means.

8. The hopper unit of claim 7 wherein said track means is in the form of parallel tracks extending along opposite sides of said hopper and interconnected for unitary operation, the ends of said tracks adjacent said pipe means being provided with hook-like stop means, rollers carried by said hopper and in supported engagement on said tracks, said rollers being dimensioned to be received in said hook-like stop means when said hopper is in communication with said pipe means for urging of said hopper down into sealed engagement with said pipe means upon further tilting of said tracks.

References Cited in the file of this patent
UNITED STATES PATENTS

| | | |
|---|---|---|
| 449,853 | Harth | Apr. 7, 1891 |
| 2,876,791 | Smith | Mar. 10, 1959 |
| 3,034,171 | Rosenthaler | May 15, 1962 |